US010229461B2

(12) United States Patent
Akiva et al.

(10) Patent No.: US 10,229,461 B2
(45) Date of Patent: *Mar. 12, 2019

(54) CONTINUOUS IDENTITY MONITORING FOR CLASSIFYING DRIVING DATA FOR DRIVING PERFORMANCE ANALYSIS

(71) Applicant: Harman International Industries, Incorporated, Stamford, CT (US)

(72) Inventors: Ohad Akiva, Ramat-Gan (IL); Alon Atsmon, Greenwich, CT (US); Dan Atsmon, Rehovot (IL)

(73) Assignee: Harman International Industries, Incorporated, Stamford, CT (US)

( * ) Notice: Subject to any disclaimer, the term of this patent is extended or adjusted under 35 U.S.C. 154(b) by 391 days.

This patent is subject to a terminal disclaimer.

(21) Appl. No.: 14/589,903

(22) Filed: Jan. 5, 2015

(65) Prior Publication Data
US 2015/0193885 A1    Jul. 9, 2015

Related U.S. Application Data

(60) Provisional application No. 61/923,872, filed on Jan. 6, 2014.

(51) Int. Cl.
*G06Q 40/08* (2012.01)
*G08G 1/16* (2006.01)
(Continued)

(52) U.S. Cl.
CPC ............. *G06Q 40/08* (2013.01); *G07C 5/008* (2013.01); *G07C 5/0808* (2013.01); *G07C 5/0841* (2013.01); *G08G 1/16* (2013.01)

(58) Field of Classification Search
USPC .......................................................... 705/44
See application file for complete search history.

(56) References Cited

U.S. PATENT DOCUMENTS 6,064,970 A * 5/2000 McMillan .......... G06Q 30/0283
                                                  705/4
6,243,015 B1 * 6/2001 Yeo ........................ G08B 21/06
                                                  340/575

(Continued)

OTHER PUBLICATIONS

Van Der Laan et al., A Simple Procedure for the Assessment of Acceptance of Advanced Transport Telematics, 1997 (Pergamon) (Year: 1997).*

(Continued)

*Primary Examiner* — Chikaodinaka Ojiaku
(74) *Attorney, Agent, or Firm* — McCoy Russell LLP

(57) ABSTRACT

Embodiments are provided for determining driving behavior. In an example method for determining driver behavior from a driving session, the method includes obtaining sensor data from a sensor during a driving session, obtaining image data from an imaging device during the driving session, and analyzing at least one of the sensor data and the image data from the driving session, to identify an event of interest. The method further includes assigning a classification to the event of interest according to a correlation between the sensor data for the event of interest and at least one image from the image data for the event of interest, the correlation based on time the sensor data and the image data is obtained during the driving session, and, wherein the at least one image for the event of interest provides the context for the event of interest.

19 Claims, 5 Drawing Sheets

(51) Int. Cl.
*G07C 5/08* (2006.01)
*G07C 5/00* (2006.01)

(56) References Cited

U.S. PATENT DOCUMENTS

| | | | | |
|---|---|---|---|---|
| 7,043,056 | B2* | 5/2006 | Edwards | G06K 9/00248 382/103 |
| 7,253,739 | B2* | 8/2007 | Hammoud | A61B 5/1103 340/573.1 |
| 7,301,465 | B2* | 11/2007 | Tengshe | G08B 21/06 340/575 |
| 7,746,235 | B2* | 6/2010 | Hammoud | G08B 21/06 340/573.1 |
| 8,140,358 | B1* | 3/2012 | Ling | G06Q 40/08 705/4 |
| 8,606,492 | B1* | 12/2013 | Botnen | G07C 5/008 701/123 |
| 9,665,910 | B2* | 5/2017 | Chalfant | G06Q 40/08 |
| 2004/0071318 | A1* | 4/2004 | Cheung | G06K 9/00362 382/104 |
| 2004/0153362 | A1* | 8/2004 | Bauer | G06Q 40/02 705/4 |
| 2004/0178890 | A1 | 9/2004 | Williams et al. | |
| 2004/0234103 | A1* | 11/2004 | Steffein | G06K 9/00268 382/104 |
| 2005/0213792 | A1* | 9/2005 | Hammoud | G06K 9/00604 382/103 |
| 2005/0232461 | A1* | 10/2005 | Hammoud | G06K 9/00604 382/103 |
| 2006/0053038 | A1* | 3/2006 | Warren | G06Q 40/08 705/4 |
| 2006/0182661 | A1* | 8/2006 | Aquila | B60K 28/063 422/84 |
| 2007/0257815 | A1* | 11/2007 | Gunderson | G08G 1/16 340/903 |
| 2008/0252412 | A1* | 10/2008 | Larsson | B60R 25/25 340/5.2 |
| 2008/0255722 | A1* | 10/2008 | McClellan | B60R 25/102 701/31.4 |
| 2008/0294690 | A1* | 11/2008 | McClellan | G01S 5/0027 |
| 2009/0024419 | A1* | 1/2009 | McClellan | G06Q 40/02 705/4 |
| 2010/0211259 | A1* | 8/2010 | McClellan | G07C 5/0816 701/31.4 |
| 2011/0153367 | A1* | 6/2011 | Amigo | G06Q 40/08 705/4 |
| 2011/0304465 | A1* | 12/2011 | Boult | B60K 28/06 340/576 |
| 2012/0072243 | A1* | 3/2012 | Collins | G06Q 10/10 705/4 |
| 2013/0169410 | A1* | 7/2013 | Amselem | G05B 1/01 340/5.52 |
| 2014/0019167 | A1* | 1/2014 | Cheng | G06Q 40/08 705/4 |
| 2014/0300739 | A1* | 10/2014 | Mimar | H04N 7/188 348/148 |
| 2015/0246654 | A1* | 9/2015 | Tadic | B60W 40/09 340/436 |

OTHER PUBLICATIONS

European Patent Office, Extended European Search Report Issued in Application No. 14200138.7, dated May 6, 2015, 5 pages.
European Patent Office, Office Action Issued in European Patent Application No. 14200138.7, dated Apr. 14, 2016, Netherlands, 4 pages.

* cited by examiner

US 10,229,461 B2

CONTINUOUS IDENTITY MONITORING FOR CLASSIFYING DRIVING DATA FOR DRIVING PERFORMANCE ANALYSIS

CROSS REFERENCE TO RELATED APPLICATIONS

This application claims priority to U.S. Provisional Patent Application No. 61/923,872, entitled "CONTINUOUS IDENTITY MONITORING FOR CLASSIFYING DRIVING DATA FOR DRIVING PERFORMANCE ANALYSIS," filed Jan. 6, 2014, the entire contents of which are hereby incorporated by reference for all purposes.

BACKGROUND

The present disclosure is directed to methods and systems for calculating insurance premiums based on an analysis of driver behavior, and verification of the actual driver for whom the behavior is being analyzed.

Current programs which determine automobile insurance premiums are based on data collected on external devices on the vehicle. These devices include those with on board diagnostic sensors, and are also black boxes and other sensors, which detect, for example, location, speed, and acceleration, of a vehicle. By analyzing the data from the sensors, a determination of the driving behavior is made, from which automobile insurance premiums are calculated. For example, a "hard" braking event is detected by rapid decreases in speed and acceleration. Such hard breaking events are typically associated with inattentive or distracted drivers, who have to come to a quick stop based on their inattentiveness, which is bad driving behavior. Such bad driving behavior is typically associated with a high risk of accidents, hence, this driver will pay higher insurance premiums, when compared to a driver deemed to be "safer" or a lower risk.

However, this sensor data alone is not enough, and may not provide all of the facts about the particular driving behavior, and the event from which it is based. This is because not all data detected, which initially appears to be bad or unsafe driving behavior, is actually indicative of bad or unsafe driving. For example, when the sensors detect a hard braking event, it may not be the fault of an inattentive or distracted driver having to come to a quick stop, but rather, a driver forced to brake suddenly to avoid colliding with another vehicle entering their lane or driving path. Here, the driver has acted correctly and safely. However, without more than the data from the sensors, there is not any way of knowing that this action was actually a safe and correct driving behavior.

SUMMARY

The present disclosure, in some embodiments, is directed to a method for determining driver behavior from at least one driving session. The method comprises: obtaining sensor data from at least one sensor during at least one driving session; obtaining image data from at least one imaging device during the at least one driving session; analyzing at least one of the sensor data and the image data from the at least one driving session, to identify at least one event of interest; and, assigning a classification to the at least one event of interest according to a correlation between the sensor data for the at least one event of interest and at least one image from the image data for the at least one event of interest, the correlation based on time the sensor data and the image data is obtained during the at least one driving session, and, wherein the at least one image for the at least one event of interest provides the context for the at least one event of interest.

Optionally, the method additionally comprises analyzing the classification of the at least one event of interest to determine a score for the driver behavior.

Optionally, the at least one event of interest includes a plurality of events of interest.

Optionally, the method additionally comprises calculating an insurance premium for at least one of the driver and the vehicle, from at least one of a score of driver behavior and at least one event of interest.

Optionally, each event of interest of the plurality of events of interest is classified as one of a positive event, a negative event, or an exception.

Optionally, the obtaining data from the at least one imaging device includes obtaining images of the path traversed by the vehicle during the driving session.

Optionally, the obtaining data from the at least one imaging device includes obtaining images of the driver of the vehicle during the driving session.

Optionally, the context provided by the at least one image relates to at least one of identification of the driver, and actions taken by the driver.

Optionally, the method additionally comprises obtaining additional data about the driver, and using this data to recalculate the score for the driver behavior.

Optionally, the at least one sensor includes a sensor for detecting at least one of acceleration, speed, location, proximity of the vehicle to other vehicles, revolutions per minute (RPM) of the engine, sounds, obstacles, weather and atmospheric conditions, and light.

Optionally, the driving session includes the time period beginning when the driver enters the vehicle, and ends when the driver exits the vehicle, or any predefined portion there between.

Optionally, the sensor data and the image data is transmitted to at least one storage medium over a communications network.

Optionally, the sensor data and image data is transmitted over a communications network to a computer linked to the communications network, the computer for the analyzing at least one of the sensor data or the image data from the at least one driving session, to identify at least one event of interest.

Optionally, the at least one driving session includes a single driving session and the score is determined for the single driving session.

The present disclosure, in some embodiments, is directed to a system for determining driver behavior from at least one driving session. The system comprises: a plurality of sensors for obtaining sensor data during at least one driving session; an imaging device for obtaining images during the at least one driving session; and, a processor in communication with the plurality of sensors and the imaging device. The processor is programmed to: analyze at least one of the sensor data or the image data from the at least one driving session, to identify at least one event of interest; and, assign a classification to the at least one event of interest according to a correlation, made by a correlation module, between the sensor data for the at least one event and at least one image from the image data for the at least one event of interest, the correlation based on time the sensor data and the image data is obtained during the at least one driving session, and, wherein the at least one image for the at least one event of interest provides the context for the at least one event of interest.

Optionally, the processor is additionally programmed to analyze the assigned classification of the at least one event of interest to determine a score for the driver behavior.

Optionally, the processor is additionally programmed to calculate insurance premiums for at least one of the driver and the vehicle, from at least one of a score of driver behavior and at least one event of interest.

Optionally, the imaging device includes a camera.

Optionally, the imaging device includes a plurality of cameras on both sides of the imaging device for obtaining front and rearward images with respect to the vehicle.

Optionally, the processor is additionally programmed to correlate a driver identification by associating an image of the driver to the at least one event of interest, for the at least one driving session.

Optionally, the system additionally comprises a wearable device for the driver for obtaining biometric data of the driver during the at least one driving session, the wearable device in communication with the processor, the wearable device for obtaining biometric data for the driver.

Optionally, the processor is additionally programmed to correlate a driver identification by associating biometric data of the driver to the at least one event of interest, for the at least one driving session.

Optionally, the plurality of sensors includes sensors for detecting at least one of: acceleration, speed, location, proximity of the vehicle to other vehicles, revolutions per minute (RPM) of the engine, sounds, obstacles, weather and atmospheric conditions, and light.

Optionally, the wearable device includes sensors for at least one of heart rate, pulse rate, body temperature, skin moisture, fat, and an imaging device for visually identifying the driver.

Optionally, the processor is additionally programmed to create a biometrical behavioral profile from the biometric data obtained from the wearable device during the at least one driving session.

Optionally, the at least one driving session includes a plurality of driving sessions and the processor is additionally programmed to create a biometrical behavioral profile from the biometric data obtained from the wearable device during the plurality of driving sessions.

Optionally, the processor is additionally programmed to calculate an insurance premium for at least one of the driver or the vehicle, from the biometrical behavioral profile.

Optionally, the processor is additionally programmed to transmit data to the driver based on the biometrical behavioral profile created for the driver.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1A:
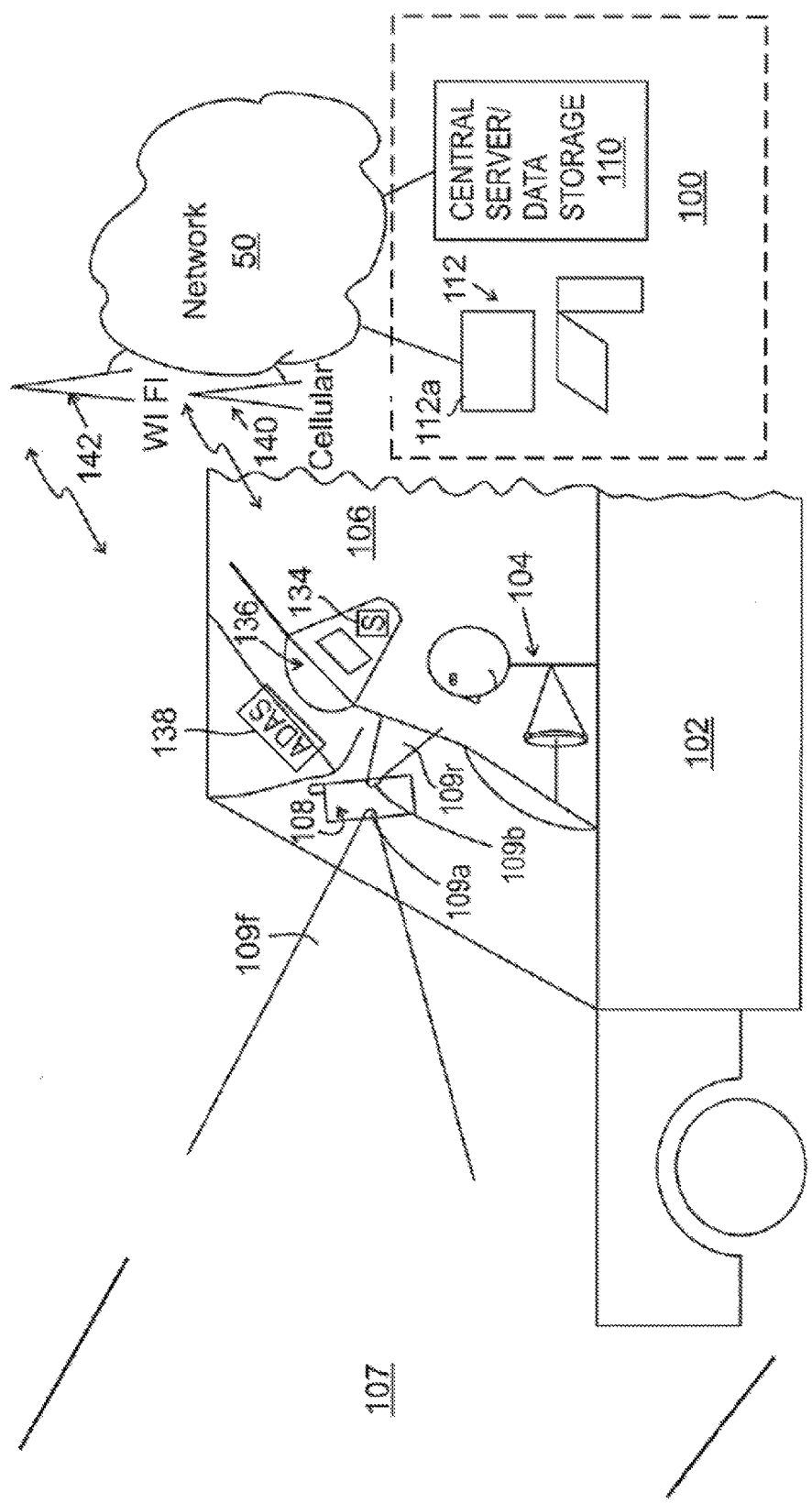
FIG. 1A is a diagram showing embodiments of the present disclosure in operation in an exemplary environment.

Throughout this document, an "event of interest" includes an action or condition of the motor vehicle, indicative of driving characteristics. These driving characteristics include, for example, breaking, accelerating/decelerating, increasing/decreasing speed, stopping/starting, proximity, e.g., following distance with respect to another vehicle, distance between the vehicle and the edge of the road, cruising speed, engine operation, e.g., RPM (revolutions per minute) detection, vehicle geographic location, sounds/voices, obstacles in the vehicle's path, road hazards, temperature, weather conditions, light conditions, road obstacles, traffic signals, e.g., traffic lights and traffic signs, cellular telephone calls, texting and other cellular phone messaging, and biometric data which is detected by one or more sensors of the motor vehicle, an external device or individually positioned sensor, or a noted or otherwise indicated point or portion of the video data of driver while operating the vehicle, or of the video data of the path being traversed by the motor vehicle.

Throughout this document, "driving sessions" are time periods when a driver is primarily operating a vehicle, and begins when the driver enters or otherwise engages the vehicle and ends when the driver exits, or otherwise disengages from the vehicle. A "driving session" may also be a selected portion of the aforementioned time period. The term "vehicle" may include a motor vehicle such as an automobile, truck, or the like, but also included by this term are motorcycles and any other motorized vehicles.

Throughout this document, "driving patterns" are the manner in which a driver operates a motor vehicle. Embodiments of the present disclosure are directed to methods and systems where driving patterns are learned from actual driving actions or non-actions of the driver, at any given moment during the driving session.

Throughout this document, an infotainment system may refer to a system built into a vehicle. The system may be computer controlled, may be able to connect to both cellular and wireless networks, and may include one or more sensors, a location monitoring functionality, such as a global positioning system (GPS) or a cellular network location service, wireless communication functionality, such as a cellular communication functionality and/or any network which provides access the Internet. The infotainment system may include entertainment functions such as radio, television, video, and play music and other audio from handheld devices such as MP3, players, tablets, smartphones, and/or other suitable mobile computing devices.

Some embodiments of the present disclosure are directed to methods and systems for interpreting driving events by correlating different data streams, one data stream from sensors, and one data stream from an imaging device. The correlation allows classifying each one of the driving events in its context, for instance for driver estimation, for example for insurance or personal/parental evaluation purposes. Each driving event for which a correlation of the data streams is made may be correlated with a driver identification, optionally continuous, by either image data of the driver and/or biometric data of the driver.

Some embodiments of the present disclosure are directed to methods and systems for determining insurance premiums utilizes correlations between sensed data associated with driver behavior for the vehicle, and image data, to identify events during a driving session, and place those events into context, based on the image data. The events are then classified, with the scores of the classifications used to determine driver behavior, which is in turn used to set automobile insurance rates for the driver and the associated vehicle. The continuous driver identification may be used to authenticate each piece of data used for scoring or a ranking a driver.

Embodiments of the present disclosure are directed to methods and systems for visually interpreting driving patterns in a context provided by a visual image correlated to the driving pattern, to determine the quality of the driver's behavior, e.g., if the driver is a safe and prudent driver. Such a driver is typically considered low risk, and accordingly, pays lower automobile insurance premiums. The visual images are collected from images of the path traversed by the vehicle during the driving session, and the requisite images are correlated with sensor data collected at a certain time during the driving session. Visual images of the driver are also collectable and correlated with the collected sensor data for the certain time during the driving session to determine the driving behavior. Embodiments of the disclosure use the sensor data with one or both of the visual image of the path traversed or the visual image of the driver.

Embodiments of the present disclosure utilize sensors and imaging devices associated with common devices, such as smart phones or other hand held devices. This eliminates the need for separate, added, or retrofitted sensors, black boxes and the like to the vehicle, to detect driving patterns, as the necessary information to detect events. Accordingly, the driving patterns are obtained through the aforementioned smart phones and other handheld devices.

Embodiments of the present disclosure allow for an increased number of driver behaviors to be identified from the sensed events, which could not be identified with only sensor data. These behaviors include tailgating, additional driver inattentiveness or distractions, such as eating or drinking while driving, talking and texting on a mobile telephone, sleepy or tired driving, drifting out of a lane or off of the road, incomplete stops or not stopping at traffic lights or stop signs, driving too close to hazards, such as railroad crossings, and driving in bad weather, snow, ice, strong winds, rainstorms.

Other embodiments of the disclosure are directed to systems and methods for monitoring the driver in conjunction with the sensors, which sense events from which driving behaviors are determined.

Other embodiments of the present disclosure include a wearable device, which identifies the driver, visually and/or biometrically, and pairs that driver with the sensed driving events. By identifying the driver during the event, insurance fraud is prevented, as the driver during the event is known and clearly identifiable.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. For example, the methods described below may be performed by a processor in combination with one or more hardware elements, including but not limited to storage devices, switches, circuits, actuators, sensors, and/or other suitable hardware components.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1A, which shows an operating environment for a non-limiting exemplary system 100, a computer system, which, in accordance with some embodiments of the disclosure, correlates sensor data with image data for identified events of interest. The correlated sensor data and image data is typically based on the time at which the event of interest occurred. The image data is used to place the event of interest into context, so that the event of interest can be classified. The classification is used to determine driver behavior, which is in turn, used, for example, in setting insurance premiums for the driver and/or the vehicle. The system 100 is shown linked over a communications network 50, either directly or indirectly, to various sensors and imaging devices of a motor vehicle 102. The sensors and imaging devices link to the system 100 over the network 50, and are internal and external with respect to the vehicle 102. The vehicle 102 is operated by a driver 104 or operator, from inside the cabin 106 of the vehicle 102. The vehicle 102 is being driven, for example, along a road 107.

The sensors and imaging devices are in, for example, a hand-held computer device 108, which is a communication device, for communicating over networks, such as a mobile telephone, for example, a smart phone. The hand-held computer device 108 also includes imaging devices, such as a forward facing camera 109a, oriented to capture images in the driver's field of view 109f in front of the vehicle 102, and a rearward or driver-facing camera 109b, to capture images inside the cabin 109r, in particular, images of the driver 104 during the driving session while operating the vehicle 102. Other imaging and video detection devices are permissible, both inside and outside of the vehicle 102.

The system 100 includes for example, a central or main server 110, which is one or more servers, and multiple user computers, represented by the computer 112, including the display monitor 112a, which is shown as local, but is also permissible as a remote computer. The user computers 112 are used by various personnel of the enterprise for the system 100, to operate in conjunction with the central server 110.

The system 100 is, for example, a computer system, implemented in a user-server configuration according to some embodiments of the present disclosure and addressable over the communications network 50, such as a Local Area Network (LAN), and a Wide Area Network (WAN), including public networks such as the Internet. The central server 110 and user computer 112 are shown as linked to the network 50, but may also be directly linked on a local network when the enterprise, and also, the local network is linked to the network 50.

The system 100, in particular, the central server 110 utilizes hardware, software, and combinations thereof, for analyzing sensed events, indicative of driver behavior or aspects thereof, for example, in order to set automobile insurance premiums for the driver and the respective motor vehicle. While numerous components are detailed below, numerous servers, machines, devices, computer systems and the like may be linked, either directly or indirectly, to the network 50, for operation with the exemplary system 100.

Within the cabin 106 of the motor vehicle 102 are a plurality of sensors, to gather data, used in identifying events of interest. The sensors, for example, continuously monitor the vehicle during the driving session to gather data, or activate when data is detected or according to another trigger, in order to gather the data.

Figure 2:
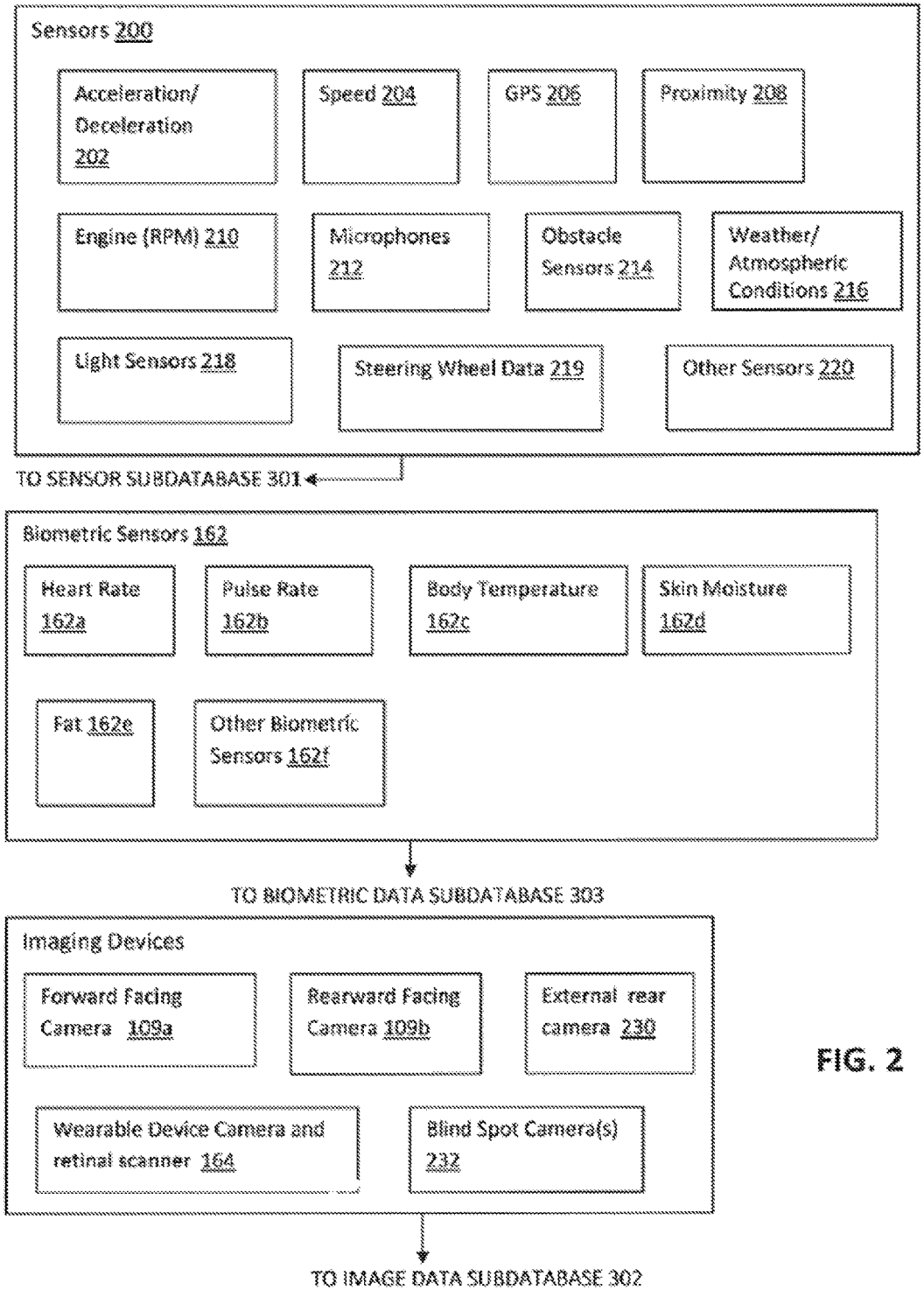
FIG. 2 is a diagram of the sensors employed with embodiments of the present disclosure.

The sensors 200, as shown in FIG. 2, include accelerometers 202, for detecting acceleration/deceleration of the vehicle, as occurs during braking, other starts/stops, or speeding up, speed sensors 204, to detect vehicle speed when the vehicle is speeding up/slowing down and cruising, for example, to detect speeds over legal speed limits, GPS sensors 206, to detect geographic location of the vehicle, e.g., is the vehicle on a paved or dirt road, or off road, in a safe or unsafe location, as well as vehicle speed, proximity sensors 208, to detect distances between the vehicle and other vehicles, such as determining following distances including tailgating, and distance to the edge of the road or lateral distances to other vehicles, engine sensors 210 for detecting engine operation parameters, such as RPM, to gather data on rapid acceleration or rapidly increasing speed, microphones 212, both inside the vehicle 102, for detecting driver and passenger voices, playing of the radio or other device, such as an MP3 player, computer, television or other video player, and sounds of the vehicle 102, both inside and outside of the vehicle 102, obstacle sensors 214, for detecting objects in the path of the vehicle, including other vehicles, pedestrians, animals, road hazards, such as pot-holes, ice, other objects on the road, weather sensors 216, for detecting weather conditions, such as temperature, barometric pressure, humidity, light sensors 218, for determining levels of sunlight and darkness, and other sensors 220, which may be added by retrofits, updates, and the like.

The aforementioned sensors 202-220, in any desired quantity, arrangement, and in any combination, are on handheld computer device 108, and represented by the box "S" 134 in the infotainment system 136 of the vehicle. The sensors 202-220 may be located on the handheld computer device 108, or in the infotainment system 136 of the vehicle, alone, or in any combination between the handheld computer device 108, and in the infotainment system 136. The infotainment system 136 may include an additional sensor 219 for steering wheel data, for estimating driver behavior. Additional sensors of the sensors 202-220 may be located inside or external to the vehicle 102, in addition to the sensors in one or both of the handheld computer device 108 and the infotainment system 136.

The infotainment system 136 includes an on-board (OBD) plug (not shown). The handheld computer device 108 can connect to the infotainment system 136 via this OBD plug. This connection integrates the hand held computer device 108, including its smart phone and communication applications, including messaging, by texting, short message service (SMS) and other downloaded applications, such as social networking application and the like, with the sensors and imaging devices of the infotainment system 136.

For example, where the handheld computer device 108 is a smart phone, accelerometers in the smart phone detect acceleration and deceleration. The GPS capabilities detect speed, including speed detection when the vehicle speeds up and slows down, as well as cruising speeds, in both forward and backward directions. The GPS capabilities also provide location detection. A proximity sensor determines the following distance of the vehicle with respect to other vehicles, e.g., tailgating, an improper and unsafe following distance, and a microphone detects sound, both external to the vehicle 102 and internal to the vehicle 102, for example, sounds made by the driver 104 inside the cabin 106, such as playing the radio or listening to other entertainment, talking in the cabin 106, talking on a mobile phone, dialing or texting, or surfing the internet on the handheld communication device 108. The handheld computer device 108 also includes a camera, and can include multiple cameras 109a, 109b, one on each side of the device 108, for forward and rearward imaging, as detailed herein. By using the handheld computer device 108, the vehicle does not have to be modified with additional sensors, cameras and the like, reducing costs to companies that seek to monitor driver behavior, since important data can be determined from the sensors and imaging devices in the handheld computer device 108.

Additional sensors are also found in Advanced Driver Assistance Systems (ADAS) 138, which may be built into the vehicle 102. ADAS are systems which help the driver with the driving process. When designed with a safe Human-Machine Interface, the ASAS increases vehicle safety, and more generally, road safety. The ADAS system 138 may be stand alone in the vehicle 102 or integrated into the infotainment system 136.

ADAS systems, for example, ADAS system 138, include, for example, an in-vehicle navigation system, with GPS and Traffic Message Channel (TMC), providing up-to-date traffic information, adaptive cruise control (ACC), lane departure warning system, lane change assistance, collision avoidance system (pre-crash system), intelligent speed adaption, night vision, adaptive light control, a pedestrian protection system, automatic parking, traffic signal and traffic sign recognition, blind spot detection, driver drowsiness detection, vehicular communication systems, hill descent control, and, electronic vehicle warning sounds.

The ADAS system 138 also includes a forward facing camera, which can perform proximity sensing and obstacle (object) detection, functions by detecting objects, such as vehicles, pedestrians and animals and objects and their distance from the vehicle. The ADAS system 138 may also include RADAR and LIDAR (Light Detection and Ranging) to perform proximity sensing and object detection, and are part of the obstacle sensors 214. For example, in the ADAS system 138, the collision alerts serve as reference points for a driver's reaction to the alert. The sensors in the system 138 may also detect how long the driver was on a path to a collision, from tailgating, lane crossing, drifting off of the road, and the like, until he recognized that he had to react to avoid the collision.

The graphics of the on screen display from the ADAS system 138 may be observed, to see what conditions the driver was being warned of at any given time during the driving session. Also, the sensors detailed above could be used to determine the action the driver took once he was alerted by the ADAS system 138. For example, should there not have been an action taken after a collision warning, and a collision resulted, this may be evidence of fraud, or driver error, which is of interest to insurance companies.

Numerous functions and operations of the ADAS are programmable into the hand held computer device 108, or downloadable via a mobile application. In addition to the sensors and imaging devices detailed for the hand held computer device 108 above, the additional functionalities of the ADAS system in the hand held computer device 108, may include, for example, an in-vehicle navigation system, with GPS and Traffic Message Channel (TMC), providing up-to-date traffic information, lane departure warning system, lane change assistance, collision avoidance system (precrash system), intelligent speed adaption, night vision, adaptive light control, a pedestrian protection system, traffic signal and traffic sign recognition, blind spot detection, driver drowsiness detection, vehicular communication systems, and electronic vehicle warning sounds. This augmented hand held computer device can function alone to correlate between sensor data and visual or image data, to define events of interest.

Additionally, the aforementioned modified hand held computer device 108 may be in the form of an aftermarket device, absent the calling and messaging, e.g., SMS (short message service) features found in the hand held computer device 108. This aftermarket modified hand held device is, for example, in the form of a mirror, in particular, a rear view mirror mountable on the windshield or in close proximity thereto, of the vehicle 102.

The aforementioned sensors 202-220, in the handheld computer device 108, the infotainment system 136, in the ADAS 138, and other sensors, both internal and external with respect to the vehicle 102, transmit the detected data, for example, in a data stream to the system 100 over the network 50, either via a cellular network 140 or via WiFi 142. The aforementioned sensor data is also storable in memory in the handheld computer device 108, or in memory, or in a recording system, associated with the infotainment system 136 or the ADAS system 138.

Alternatively, the sensors 134 and ADAS 138 may link to the handheld computer device 108 via Bluetooth®. Accordingly, the data obtained by these components is transmitted to the main server 110 via the handheld computer device 108, either over the cellular network 140, or by WiFi 142.

Also within the cabin 106 is an imaging device, such as one or more cameras 109a, 109b for recording images, image data and the like. The imaging device is, for example, part of the hand held computer device 108, with forward 109a and rearward 109b facing cameras. The imaging device may also be a separate camera.

Alternatively, the aforementioned imaging devices can be single directional cameras. However, if multidirectional imaging is desired, e.g., forward and rearward imaging, any combination of the aforementioned single directional cameras, and the respective imaging devices is permissible.

Referring to the hand held computer device 108, which is equipped with imaging functionalities, the camera 109a is positioned forward facing, to image the pathway over which the vehicle 102 travels 109f, or rearward facing, to image rearward 106r, inside the cabin 106, in particular, image the driver 104 during the driving session while operating the vehicle 102. Single forward facing and rearward facing cameras may be used, as well as a single device with two cameras, one forward facing and the other rearward facing. The imaging of the pathway and inside the cabin may be performed separately, or together, provided the imaging device has camera functionality on opposite or multiple sides.

The forward facing camera 109a records images, from a triggering by the processors/CPU 320 if responsive to an event of interest being identified by the sensors 200 via the event identification module 312, or all of the time which the cameras, for example, cameras 109a, 109b are activated, which may be, for example, the entire driving session or portions thereof. The images are recorded from the path which the vehicle 102 traverses. The forward facing camera 109a records the driver's field of view 109f during the driving session. The forward field of view includes, for example, vehicles that may have entered the vehicle's 102s lane, road hazards of obstacles on the road encountered, such as stalled or accident damaged vehicles, downed trees, rock and mudslides, ice patches, dead animals in the road, pot holes, railroad crossings, pedestrians entering the roadway, traffic light conditions, stop sign positioning and other viewable conditions, such as light conditions, weather, snow, ice, rainstorms, high winds, which result in breaking, slowing down, deceleration, taking evasive action including accelerating and speeding up, and the like. The camera 109a can also provide context to proximity sensor data, determining the reason for the proximity of the vehicle to another vehicle, such as tailgating, an unsafe situation, versus coming close to another vehicle to avoid a road hazard or obstacle, or driving too close to other vehicles, the edge of the road, and obstacles.

The rearward facing camera 109b is, for example, focused on the driver 104, and/or the cabin 106. The rearward facing camera 109b, like the forward facing camera 109a activates from a triggering by the processors/CPU 320 if responsive to an event of interest being identified by the sensors 200 via the event determination module 312. Alternately, the cameras, for example, cameras 109a, 109b may be activated, for the entire driving session or portions thereof. The camera 109b functions to identify the driver 104 during the driving session. The driver 104 is continuously identified during the driving session, so as to connect the sensor and image data obtained during the driving session with the identified driver. For example, the driver 104 is continuously being identified during an entire driving session. This is especially useful in shared vehicles, or vehicles with multiple drivers, a driver can be evaluated for his behavior based on multiple identifications in driving sessions in different vehicles.

By identifying the driver from images, the driver name is not needed by an insurance company. By identifying based on actual images of actual drivers, potential insurance fraud is avoided, should the driver attempt to insure himself under a different name. The camera may also record a driver's reaction to an event, to determine when the event is unexpected, or expected, and accordingly, possibly fraudulent. For example, collisions associated with other vehicles are normally unexpected, and cause a driver to react in an excited or stressful manner. If the collision is part of a fraud scheme, such as to collect money associated with an accident, the driver would know what to expect, and probably act in a calm manner, not stressed and not excited. This is because the driver is aware of the collision. Additionally, the time it took the driver to press the brakes and the intensity at which the brakes were pressed, can also be indicative of driver being aware of a fraudulent situation.

The driver may also be monitored for physical conditions such as sleepiness, driving while tired, intoxicated, under the influence of drugs, or the like, and inattentive and distracted driving, such as eating, drinking, cellular telephone use, such as calling and texting, and talking to other passengers in the cabin, all of which affect safety. The driver's inattentiveness or distractedness puts his focus on his present situation, and in turn, takes his focus off of the road, increasing the driver's likelihood of getting into an accident, or other safety compromise. Data acquired as to driver mannerisms from the rearward facing camera may be used with the driver behavior scores, to adjust the scores when determining the insurance premium for the driver.

Alternatively, the infotainment system 136 or the ADAS system 138 may include additional cameras, such as an external rear camera (not shown) for obstacle detection, and blind spot camera(s). External rear cameras, for example, are of particular importance when the vehicle backs up or parks. Additionally, such an external rear camera 230 (FIG. 2) may take images from the rear of the vehicle 102.

The blind spot cameras 232 (FIG. 2) image laterally of the vehicle 102, and detect conditions in the lateral lanes to that of the vehicle, which are typically "blind spots" to the driver, such that the driver can safely change lanes.

The aforementioned imaging devices, via their cameras, such as cameras 109a, 109b of the hand held computer device 108, are also suitable for use with facial recognition software. Such facial recognition software is particularly useful for driver identity, as detailed above, showing the actual driver at all times during the actual driving session, the driver talking with passengers in the vehicle, or otherwise distracted or inattentive. Driver identity is also determined from voice analysis, when the driver is using the hand held computer device 108 as a communications device, e.g., cellular telephone or another mobile telephone in the vehicle 102.

The handheld computer device 108, as discussed above, communicates with the system 100, to send data, for example, in a stream of image data, obtained by the cameras 109a, 109b to the system 100, in particular, the central server 110, over the network 50. The sensor and image data is, sent to the main server 110, for example, as data streams, via a cellular network, represented by cellular tower 140, or via WiFi®, represented by tower 142, and then over the network 50, where it is received by the central server 110. Additional imaging devices, including cameras, both internal and external to the vehicle are designed to wirelessly send their data, which has been obtained, to the system 100, in particular, the central server 110, over the network 50.

The image data is sent to the main server 110, for example, via a cellular network, represented by cellular tower 140, or via WiFi®, represented by tower 142, and then over the network 50, where it is received by the central server 110.

The processes of obtaining the sensor and image data and sending it to the system 100 are performed, for example, in real time, but do not need to be. This is because the sensor data stream and image data stream may be logged into the system 100 after the driving session from which they are associated has ended.

Alternatively, numerous combinations of sensors and cameras are useable to obtain the requisite and aforementioned data for the system 100 during the driving session.

Alternatively, some of the aforementioned sensors and imaging devices, e.g., camera, are also locatable outside of or external to the vehicle 102. Combinations of sensors and imaging devices, both inside and outside of the vehicle are also permissible.

Alternatively, the sensors for sensing and detecting conditions, and creating a data stream of the sensed data, and the imaging devices, which create the image data may be activated by each other. For example, only the sensors or the camera needs to be running until an event is detected by the presently running or activated component. Once the detected event is identified, the other component would activate and begin running, to capture its data for the event. This saves on battery power in the handheld communication device, or other handheld device, as well as in the infotainment system, as running of both the sensors and the camera occurs only once an event has been detected.

Alternatively, the sensors 200 and/or imaging devices, e.g., cameras, forward facing 109a, rearward facing 109b, external rear camera 230, and blind spot detection camera 232, activate from a triggering by the processors/CPU 320 if responsive to an event of interest being identified by the sensors 200 via the event determination module 312. In this case, the triggering uses a cycled buffer to store data which was recorded before the start of the event of interest. Alternatively, the sensors and imaging devices may run in a loop, whereby only event data is saved.

Figure 1B:
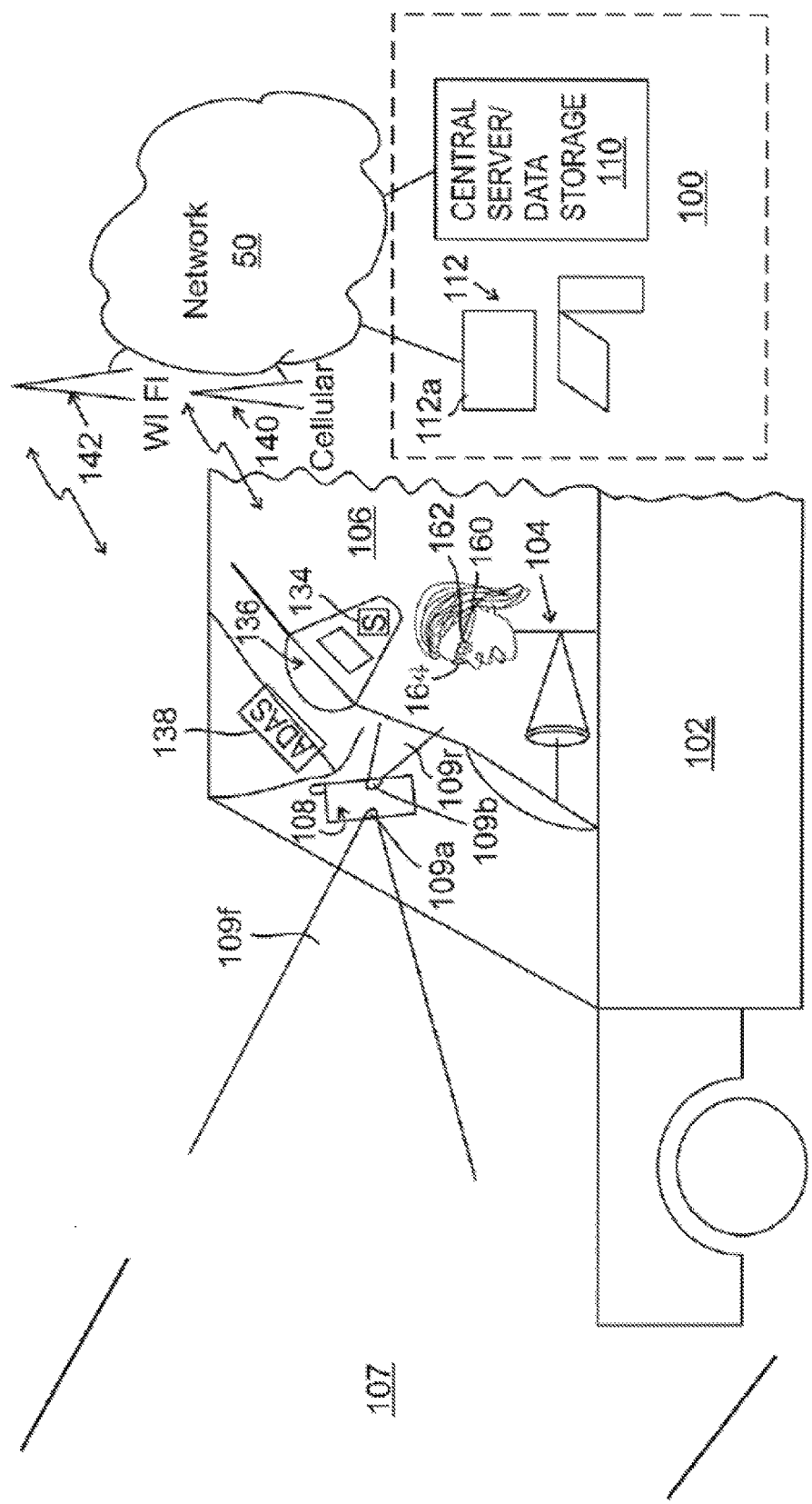
FIG. 1B is a diagram showing other embodiments of the present disclosure in operation in an exemplary environment.

Alternatively, as shown in FIG. 1B, the driver 104 is equipped with a wearable device 160. This wearable device 160 is wearable around the head of the driver 104, like eyeglasses, and allows for continuous monitoring of the driver 104 during the driving session. This device 160 may be, for example, Google® Glass®.

The wearable device 160 includes sensors 162, which detect and obtain data for biometrics, such as heart rate 162a, pulse rate 162b, body temperature 162c, skin moisture 162d, fat 162e, and other biometric parameters 162f, for identifying the driver 104. The device 160 has a camera 164, for frontward (imaging the path traversed by the vehicle) and rearward (imaging the driver or other location in the cabin 106) image data acquisition. The camera also functions as a retinal scanner, which performs a retinal scan of the eye of the driver 104 for identification.

The wearable device 160 may also be a bracelet or the like, with sensors for biometrics, such as heart rate 162a, pulse rate 162b, body temperature 162c, skin moisture 162d, fat 162e, and other biometric parameters 162f, for identifying the driver 104. Such a bracelet would operate similar to the wearable device 160, detailed above, but may not provide one or more of the camera and/or retinal scanning functions.

This biometric data is used, for example, to detect when events are genuine or fraudulent. Biometric data typically changes when the driver reacts suddenly or is surprised by a change of conditions. However, when there is little or no change in biometric data during a change of conditions, this is a possible indication that the driver was calm, as one may behave when aware of the changed condition, e.g., indicative of a fraudulent act. The biometric data can also be used to analyze driver behavior for insurability, for example, if the driver normally drives in rush hour, based on biometric data indicative of stress, tiredness, by detecting if the driver's eyes are closed, if the driver drives at night, e.g., biometric data indicative of a night time biorhythm, or typically makes short drives or long drives. Additionally, the biometric data can be used in detecting driver behavior where the driver received a first alert to a dangerous condition, but did not react, and either did or did not react to one or more subsequent alerts to the dangerous condition.

The biometric data from the biometric sensors 162 and image data from the camera, including retinal scan data, is transmitted to the system 100, in particular, the main server 110, via WiFi 142, as the device is constructed to transmit data in accordance with the WiFi 802.11 b/g standard, or alternatively, through the Handheld computer device 108 and onto the system 100, via Bluetooth®. Again, the wearable device 160, handheld computer device 108, sensors 134 and ADAS 138, can be used in any combination to obtain the requisite sensor, image, and biometric data as detailed above. Additionally, the wearable device 160 links to, and integrates with, one or more of, the hand held computer device 108, the infotainment system 136 and ADAS system 138, via Bluetooth® and the like, such that transmissions from the wearable device 160 to the system 100 over the network 50 are received through one or more of the hand held computer device 108, the infotainment system 136, and ADAS system 138, either through the cellular network 140 or via WiFi® 142.

Figure 3:
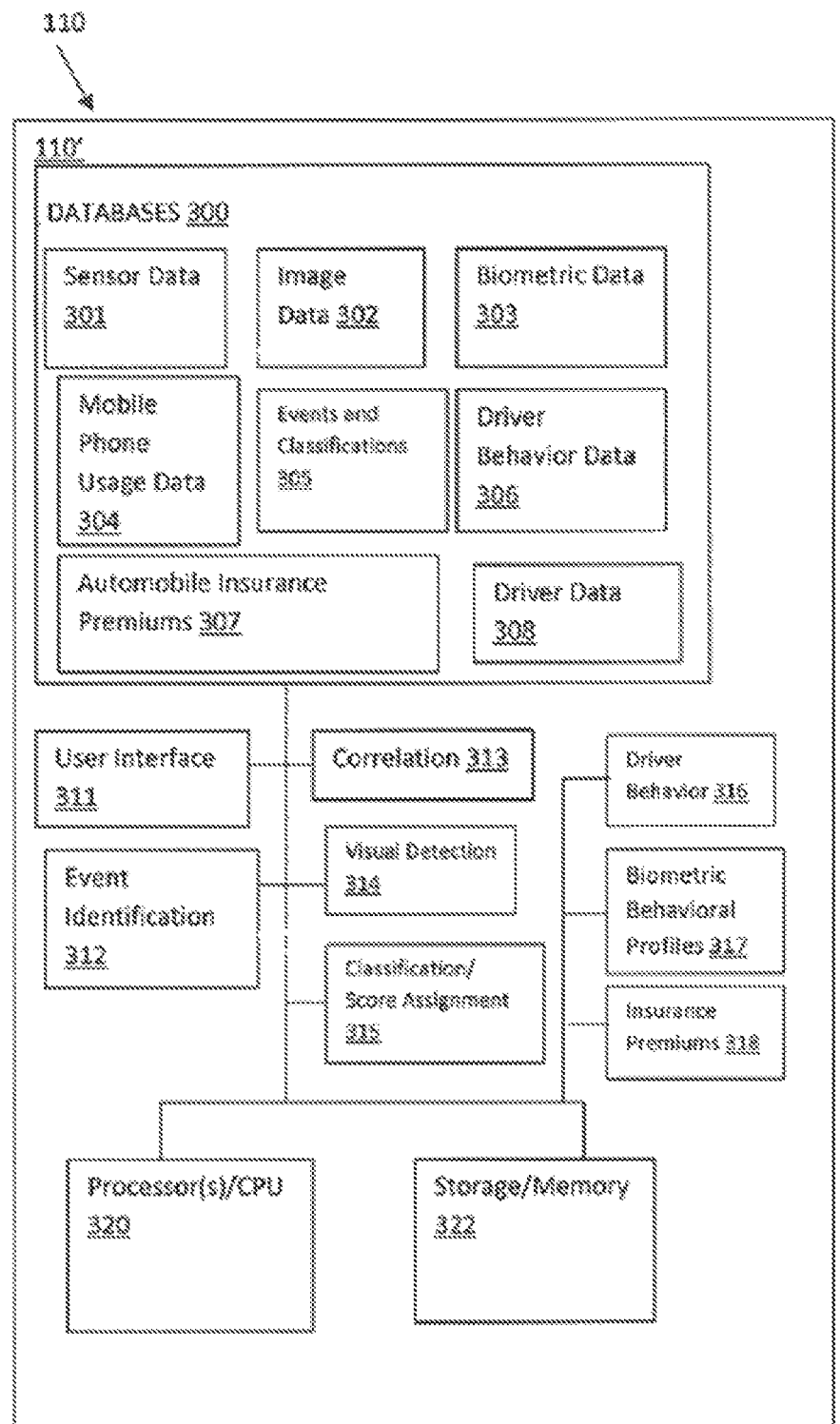
FIG. 3 is a diagram of the architecture for an example system in accordance with some embodiments of the disclosure.

FIG. 3, to which attention is now directed, shows the architecture of the main server 110. The main server 110 includes a system 110' which includes various databases 300 and modules 311-318, all of which are operatively coupled to processor(s) 320, and storage/memory 322. The databases 300 (301-308), modules 311-318, processor(s) 320, and storage/memory 322, are in electronic and data communication with each other, either directly or indirectly. While single modules 311-318, processors 320 and storage/memory 322, are shown, this is representative only, as each of these components may be a plurality of devices, and may be within or remote to the system 100, outside of the main server 110. The modules 311-318 may be hardware, software, or combinations thereof.

The database 300 includes subdatabases 301-308. The subdatabase 301 holds sensor data, which is received from the sensors 200, located in one or more of the hand held computer device, the sensors 134 of the infotainment system 136, the ADAS 138, or other sensors inside or outside the vehicle 102. The sensor data includes the data received from the sensors, for at least breaking, accelerating/decelerating, increasing/decreasing speed, stopping/starting, proximity, e.g., following distance with respect to another vehicle, distance between the vehicle and the edge of the road, cruising speed, engine operation, e.g., RPM (revolutions per minute) detection, vehicle geographic location, sounds/voices, obstacles in the vehicle's path, road hazards, temperature, weather conditions, light conditions, road obstacles, traffic signals, e.g., traffic lights and traffic signs, cellular telephone calls, texting and other cellular phone messaging, and biometric data.

The subdatabase 302 holds image data, received from cameras, such as those in the handheld computer device 108, or other handheld computing devices, cameras installed in the vehicle cabin or outside of the vehicle, from the external rear camera of the infotainment system 136 or the ADAS system 138, and from the retinal scanner, and from the camera 164 of the wearable device 160. The image data also includes, for example, retinal scans and facial recognition data.

Biometric data subdatabase 303 stores biometric data obtained by the sensors 162a-162f, and camera 164 of the wearable device 160 during the driving session. This biometric data includes heart rate, pulse rate, temperature, skin moisture, fat, and other biometric parameters, associated with the driver.

Mobile phone usage subdatabase 304 stores data on mobile phone usage of the driver, such as the date, time, and length of a phone call or a text and/or texting session data. Events and Classification subdatabase 305 stores records of events, including those events identified as events of interest by the event identification module 212. The stored data includes, for example, the locations of the corresponding sensor data and image data, along with any other relevant corresponding data, accompanied by a classification, assigned by the system 110' for the event.

Driver Behavior subdatabase 306 stores the various events from which driver behavior was determined, along with numerical scores for such driver behavior.

The ADAS system 138 data is stored in this subdatabase, along other driver identity images and facial recognition data of the drivers.

The automobile insurance premiums subdatabase stores data associated with the automobile insurance premiums for each driver in the system 110'. The Driver data subdatabase 308 stores data on each driver, such as names, addresses and contact information, their vehicle, and the driving sessions and vehicles they are identified with from image data from rearward facing cameras, such as cameras 109b, 164, including retinal scan data from the camera 164. The data is stored for each driver in the system 110', for example, those drivers who are presently or previously insured, seek to be insured, or have been denied or terminated insurance, by the enterprise that controls the system 110'.

The user interface module 311 provides the user, represented by the computer 112, to access the databases and interact with the modules of the system 110'. The event identification module 312 monitors the sensor data in subdatabase 301 and the image data in subdatabase 302, and is programmed to analyze the sensor data and the image data, to identify events, and designate events as events of interest. The events of interest are analyzed further when determining driver behavior, for example, for setting insurance premiums, as detailed below.

The correlation module 313 is programmed to correlate sensor data and image data, along with any other relevant data for each identified event, and in particular, the designated events of interest. Other relevant data which is typically correlated with the data of the event of interest is, for example, an image of the driver during the event of interest from the image subdatabase 302, and/or other form of driver identification of the driver, such as biometric identity data, from the biometrics subdatabase 303, obtained during the event.

The visual detection module 314 is programmed to detect various objects and/or aspects from the image data, such as cars, trucks, motor cycles and other vehicles, pedestrians, road hazards, weather conditions, railroad crossings, traffic lights, stop signs, and distance to objects, to provide context for each of the identified events. This data analysis from the visual detection module 314, coupled with any other data of the identified event of interest (as determined by the event identification module 312 and stored, for example in the sensor data 301 and events and classifications 305 subdatabases), associated with the image data, is analyzed by the classification/score assignment module 315. The visual detection module 314 is also programmable to identify events from the image data, including image data streams, and transmit data corresponding to the identified events to the event identification module 312. Events identifiable by the visual detection module 314, include, for example, collision alerts, tailgating, off-road alerts, and the like.

The classification/score assignment module 315 is programmed to assign a classification, for example, a positive event, a negative event, or an exception, and a score for the classification of the identified events, in particular, the events of interest. Alternatively, the image data from which an event is identified, or from which context is provided for the event is also suitable for manual analysis by a user. In this case, the user accesses the system 110', for example, the image data 301 and Events and Classification 305 subdatabases, evaluates the image data with respect to the sensor data for the event, and inputs a classification, e.g., positive event, negative event, exception, and a score for the classification, for the event into the subdatabase 305. The driver behavior module 316 is programmed to analyze the classifications and scores therefore, for the events, which have been selected for the analysis, to determine driver behavior, including driving behavior patterns for the particular driver. The module then assigns a numerical score for the driver behavior.

A biometric behavioral profile module 317 obtains the biometric data from the Biometric Data subdatabase 303. This module 317 is programmed to create a biometric behavioral profile for each driver, taken from each driver during each driving session. The biometric behavioral profiles may be for each driving session, or a plurality of driving sessions. The module 317 is also programmed to analyze the biometric behavioral profiles for each driver, and provide the driver with feedback, such as output data, about the associated driving behavior.

An insurance premium module 318 is programmed to analyze the driver behaviors, including the determined driver behavior patterns and score. This module also analyzes the biometric behavioral profiles from the biometric behavioral profile module 317, for a score to determine insurance premiums, or to determine insurance premiums directly. The module 318 then uses this information, along with selected other information, from which the driver behavior score is possibly adjusted, to calculate the insurance premium for the driver and the vehicle.

The processors 320 control the operation of the system 110'. The processors 320 are conventional processors, such as those used in servers, computers, and other computerized devices. The processors 320 may be arranged to have a central processing unit (CPU), for controlling the correlation system 100. For example, the processors may include x86 Processors from AMD and Intel, Xenon® and Pentium® processors from Intel, and other processors Other processors, such as those of the modules, may be any of the aforementioned processors.

The storage/memory 322 is conventional storage and memory, which is commercially available. The modules 311-318 may also include their own storage/memory in addition to the storage memory 322. This storage/memory 322 stores machine executable instructions associated with the operation of the modules 311-318. Also, the storage/memory 322, although shown as a single component for representative purposes, may be multiple components, and may be outboard from the system 100, and linked to the network 50.

Figure 4:
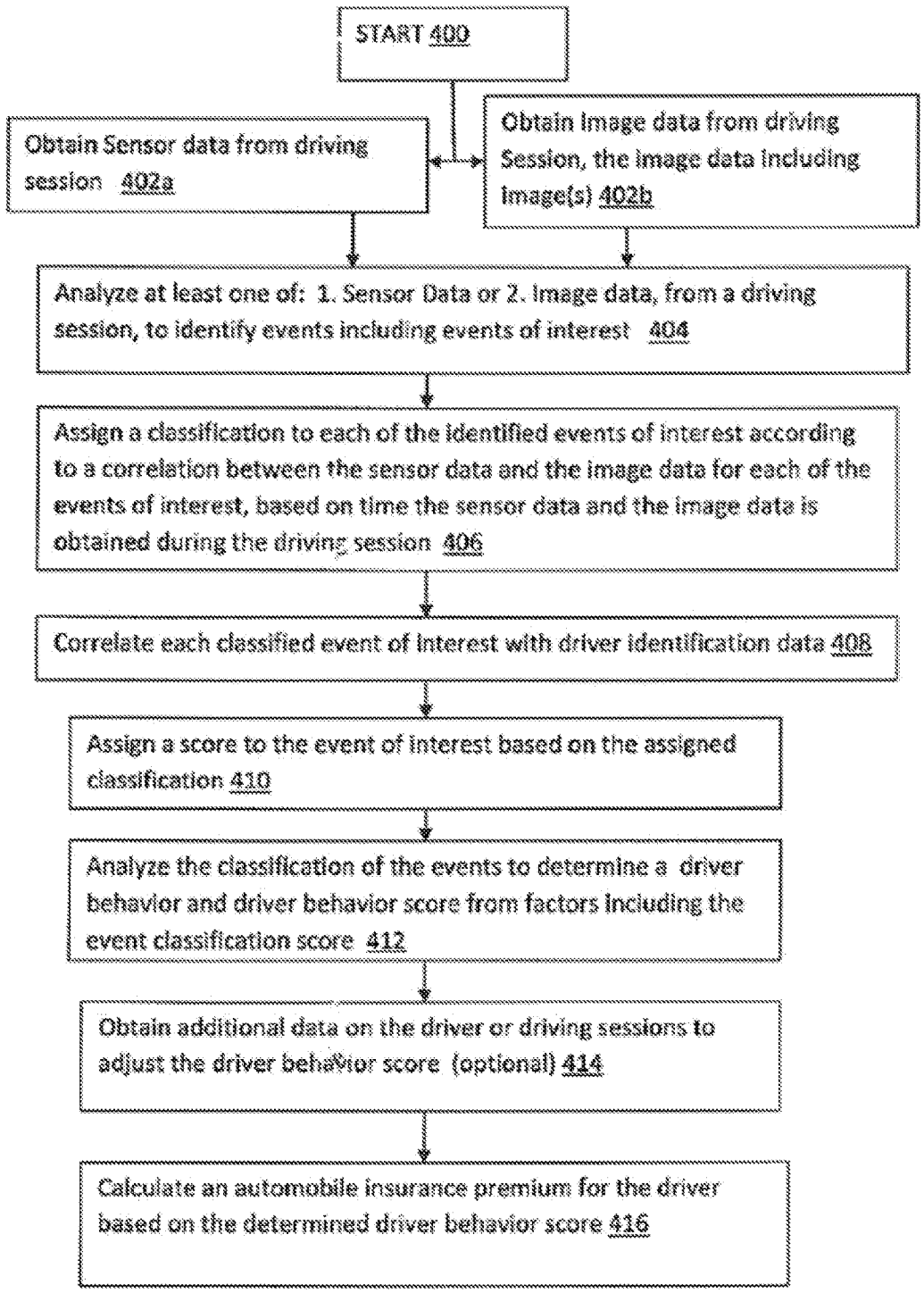
FIG. 4 is a flow diagram of a process in accordance with embodiments of the present disclosure.

Attention is now directed to FIG. 4, which is a flow diagram detailing a computerized process performed by the system 100 in accordance with an embodiment of the disclosed subject matter. Reference is also made to elements shown in FIGS. 1A, 1B, 2 and 3, and described above.

The process begins at a START, block 400. The START may be for example, an entry into the vehicle, or tuning on the vehicle ignition. The process then moves to blocks 402a, and 402b, which are performed close in time, and, for example, simultaneously. At these blocks 402a, 402b, sensor data and image data, from the respective data streams, is obtained during a driving session. At block 402a, the sensor data is being obtained from the driving session, as it is detected by the requisite sensors in the vehicle and sent over the network 50 to the subdatabase 301 for storage. At block 402b, the image data is being obtained by the cameras in the vehicle and sent over the network 50 to the subdatabase 301 for storage.

The process moves to block 404, where one or more of the now obtained sensor data and/or image data from the driving session is analyzed, to identify events, and in particular events of interest, inactive of, for example, driving characteristics of drivers. The events and the particular events of interest are identified automatically, by the event identification module 212 that is programmed to identify the events and the particular events of interest, during the driving session, from the sensor data, for example, in the subdatabase 301. Identifying the events, and in particular, the events of interest may also be performed automatically by an output of the visual detection module 214, which is programmed to analyze the image data, from subdatabase 302, for instances and irregularities, such as automobiles, trucks, motorcycles, and pedestrians entering the driver's field of view, road hazards and obstacles according to the visual data analysis, such as stalled or accident damaged vehicles, downed trees, rock and mudslides, ice patches, dead animals in the road, railroad crossings, weather conditions, running/not fully stopping for traffic signals and stop signs, and the like.

The aforementioned analysis for identifying events, in particular events of interest from sensor data and image data, as detailed immediately above, may also be performed manually, by a user, for example, at his computer 112. The user reviews the actual sensor data or image data from the respective subdatabases 301, 302, via the user interface module 311. The identified events, including the identified events of interest, which have been identified by the modules 312, 314, or manually, by the user, are then stored in the Events and Classification subdatabase 305.

The process moves to block 406, where classifications are assigned to each of the identified events of interest. The classifications assigned are according to a correlation between the sensor data and the image data from a corresponding time during the driving session, the time being, for example, the same time the sensor data and image data was obtained during the driving session. The correlation between the sensor data and the image data is performed by the correlation module 313, and the analysis of the data, sensor and image data, of the identified event, with a classification being assigned to the event is performed by the classification/score assignment module 315. The classification determined by the classification/score assignment module 315 is stored with the event in the Events and Classifications subdatabase 305.

The process moves to block 408, where each classified event is further correlated, by the correlation module 313, with driver identification data, to positively identify the driver during the driving session in which the event occurred. This driver identification data includes, one or more of, for example, a camera image of the driver, and facial recognition data from the image data subdatabase 302, and biometric data, including retinal scan data, from the biometric data subdatabase 303.

The classifications for the events of interest include, for example, a positive event, a negative event, and an exception. However, depending on the enterprise administering the system 100, there may be fewer or additional classifications for the events of interest, as well as differently defined events of interest. At block 410, to which the process moves, for example, a positive event may be a hard braking to avoid a vehicle entering the driver's lane, and accordingly, a positive score or high score is assigned to this event. A negative event may be a hard breaking to stop for a red light if the driver was inattentive, such as tired, eating, and/or distracted, using his handheld computer device 108, and/or the like. Accordingly, a negative score or low score is assigned to this event of interest. An exception may be a judgment decision by the driver, such as going through a yellow traffic light to avoid a hard braking, and accordingly, no score, or a score intermediate the aforementioned "low" and "high" scores would be assigned to this event of interest. The classification/score assignment module 315 assigns the aforementioned scores, based on being preprogrammed to do so. The aforementioned scores and their actual values are typically different, depending on the enterprise administering the system 100. The aforementioned analysis and classification may also be performed manually by a user at the computer 112, via the user interface module 311, with the user entering the determined classification for each event, and corresponding score into the Events and Classifications subdatabase 305.

The classifications of the events of interest, and the scores assigned thereto, are used to determine driver behavior, at block 412. This process is performed by the driver behavior module 316, with the resultant driver behavior determination typically issued as a numerical score. The score is calculated, for example, by analyzing selected driving sessions of the particular driver, and the scores of the classifications of the events in each driving session. The driver behavior score is stored as data in the Driver Behavior Data subdatabase 306. This process may also be performed manually, with the user, at the computer 112, determining the numerical score for the driver behavior, and entering driver behavior score into the subdatabase 206.

The process now moves to block 414, an optional process for obtaining additional data from which to adjust the driver behavior score. This optional data includes, for example, sensor data and image data associated with the identified events, but not used to identify the event, from the subdatabases 301, 302, respectively, biometric data, associated with the identified events based on the time in the driving session such biometric data was obtained, for the Biometric Data subdatabase 303, the biometric behavioral profile for the driver from module 317, mobile phone information, such as if the driver was on a call or texting during the identified events, from the subdatabase 304, other safety data, for example, obtained from the rearward facing camera, such as driver identity (e.g., images of the actual driver(s) during the driving session), driver behaviors, such as images showing tiredness, inattentive and distracted driving, stored in the image subdatabase 302, and data from the ADAS system 138, from the driver behavior subdatabase 306.

The driver behavior data alone, including the numerical score for the driver behavior, alone or with the optional adjustments, is analyzed. From this analysis, the automobile insurance premium for the driver, and also, for example, the driver's vehicle, is calculated, at block 416. This calculation is performed by the Insurance Premium module 318. In addition to calculating insurance premiums, the Insurance premium module 318 also issues denials for insurance, based on the determination that the driver is too high a risk, for this particular automobile insurance. This insurance premium information and denial information is output by the system 110' to various computers of the enterprise. Customers of the insurer are notified of this information either electronically, via e-mail, text messages, telephone calls, or postal mail.

The methods as described above are used in the fabrication of integrated circuit chips.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The invention claimed is:

1. A method for determining driver behavior from at least one driving session, comprising:
   sensing at least one physical attribute of biometric data of a driver of a vehicle, by at least one sensor to obtain sensor data during the at least one driving session;
   capturing a plurality of images by at least one imaging device to obtain image data during the at least one driving session;
   analyzing the sensor data and the image data from the at least one driving session, to identify at least one event of interest, and a reaction of the driver to the at least one event of interest;
   creating a biometrical behavioral driver profile from the biometric data extracted from at least some of the at least one sensor;
   obtaining predefined characteristics of a positive event, of a negative event, and of an exception event;
   correlating between the sensor data for the at least one event of interest and at least one image from the image data for the at least one event of interest, based on a time the sensor data and the image data are obtained during the at least one driving session, wherein the at least one image for the at least one event of interest provides context for the at least one event of interest;
   classifying the at least one event of interest to one of three classes defined as a positive event class, a negative event class, and an exception event class according to the correlation and based on the predefined characteristics;
   determining when the driver reaction is an expected reaction to the at least one event of interest according to the classification;
   assigning a driver profile score to the biometrical behavioral driver profile, based on the determination;
   transmitting the sensor data and the image data, in real time, over a communication network, to a remote server to be presented to a user of the remote server; and
   transmitting data to the driver of the at least one driving session to make the data available to the driver, based on the biometrical behavioral driver profile and according to the driver profile score.

2. The method of claim 1, wherein the sensor data and the image data are transmitted to at least one storage medium over the communication network.

3. The method of claim 2, wherein the sensor data and the image data are transmitted over the communication network to the remote server for the analyzing at least one of the sensor data or the image data from the at least one driving session, to identify the at least one event of interest.

4. The method of claim 1, wherein the at least one driving session includes a single driving session and the driver profile score is determined for the single driving session.

5. The method of claim 1, wherein the at least some of the at least one sensor used to extract the biometric data is contained in a wearable device.

6. The method of claim 5, wherein the wearable device includes sensors for measuring at least one of heart rate, pulse rate, body temperature, skin moisture, and fat, and an imaging device for visually identifying the driver.

7. The method of claim 1, wherein the at least one event of interest includes a plurality of events of interest.

8. The method of claim 7, additionally comprising calculating an insurance premium for at least one of the driver and the vehicle, from at least one of the driver profile score and the at least one event of interest.

9. The method of claim 7, wherein the obtaining image data from the at least one imaging device includes obtaining images of a path traversed by the vehicle during the at least one driving session.

10. The method of claim 7, wherein the obtaining image data from the at least one imaging device includes obtaining images of the driver of the vehicle during the at least one driving session.

11. The method of claim 10, wherein the context provided by the at least one image relates to at least one of identification of the driver and actions taken by the driver.

12. The method of claim 7, additionally comprising obtaining additional data about the driver and using the additional data to recalculate the driver profile score.

13. A system for determining driver behavior from at least one driving session, comprising:
    at least one sensor for sensing at least one physical attribute of biometric data of a driver of a vehicle to obtain sensor data during the at least one driving session;
    an imaging device for capturing a plurality of images to obtain images during the at least one driving session; and
    a processor in communication with the at least one sensor and the imaging device, the processor programmed to:
      analyze at least one of the sensor data or image data from the at least one driving session, to identify at least one event of interest and a reaction of the driver to the at least one event of interest;
      create a biometrical behavioral driver profile from the biometric data extracted from at least some of the at least one sensor;
      obtain predefined characteristics of a positive event, of a negative event, and of an exception event;
      correlate between the sensor data for the at least one event of interest and at least one image from the image data for the at least one event of interest, based on a time the sensor data and the image data are obtained during the at least one driving session, wherein the at least one image for the at least one event of interest provides context for the at least one event of interest;
      classify the at least one event of interest to one of three classes defined as a positive event class, a negative event class, and an exception event class according to the correlation and based on the predefined characteristics;
      determine when the driver reaction is an expected reaction to the at least one event of interest according to the classification;
      assign a driver profile score to the biometrical behavioral driver profile, based on the determination;
      transmit the sensor data and the image data, in real time, over a communication network, to a remote server, to be presented to a user of the remote server; and
      transmit data to the driver of the at least one driving session to make the data available to the driver, based on the biometrical behavioral driver profile and according to the driver profile score.

14. The system of claim 13, wherein the imaging device includes a camera.

15. The system of claim 14, wherein the imaging device includes a plurality of cameras on both sides of the imaging device for obtaining front and rearward images with respect to the vehicle.

16. The system of claim 13, additionally comprising a wearable device to be worn by the driver for obtaining the biometric data of the driver during the at least one driving session, the wearable device in communication with the processor.

17. The system of claim 16, wherein the processor is additionally programmed to correlate a driver identification by associating the biometric data of the driver to the at least one event of interest, for the at least one driving session.

18. The system of claim 16, wherein the wearable device includes sensors for measuring at least one of heart rate, pulse rate, body temperature, skin moisture, and fat, and an imaging device for visually identifying the driver.

19. The system of claim 13, wherein the processor is additionally programmed to correlate a driver identification by associating an image of the driver to the at least one event of interest, for the at least one driving session.

\* \* \* \* \*